US008005601B2

(12) United States Patent
Janssen

(10) Patent No.: US 8,005,601 B2
(45) Date of Patent: Aug. 23, 2011

(54) METHOD AND CONTROL UNIT FOR DAMPING LOAD IMPACTS WITH AN OPEN TORQUE CONVERTER LOCKUP CLUTCH

(75) Inventor: Antoon Nicolaas Janssen, Brühl (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 850 days.

(21) Appl. No.: 11/963,961

(22) Filed: Dec. 24, 2007

(65) Prior Publication Data

US 2008/0215216 A1 Sep. 4, 2008

(30) Foreign Application Priority Data

Dec. 23, 2006 (DE) ......................... 10 2006 061 439

(51) Int. Cl.
*G06F 17/00* (2006.01)
*F16H 47/08* (2006.01)

(52) U.S. Cl. ............ 701/54; 701/101; 123/347; 477/54; 477/109; 477/116; 477/174

(58) Field of Classification Search .................... 701/54, 701/61; 475/66; 477/77
See application file for complete search history.

(56) References Cited

U.S. PATENT DOCUMENTS 5,643,137 A * 7/1997 Suzuki .......................... 477/169
6,266,597 B1 7/2001 Russel et al.
6,910,990 B2 * 6/2005 Doering et al. ............... 477/110
2003/0100405 A1 * 5/2003 Homeyer et al. ............. 477/174
2006/0154779 A1 * 7/2006 Schlecht ......................... 477/37
2007/0213910 A1 * 9/2007 Doering et al. ................. 701/54
2008/0022969 A1 * 1/2008 Frenz et al. ................... 123/347
2008/0026908 A1 * 1/2008 Matthews ..................... 477/110
2009/0218151 A1 * 9/2009 Huber et al. ............. 180/65.265

FOREIGN PATENT DOCUMENTS

DE 10206199 C1 12/2002
DE 102004005728 A1 8/2005
FR 2881795 A1 8/2006
GB 2389922 A * 12/2003
WO 2006085023 A1 8/2006

OTHER PUBLICATIONS

European Search Report dated Nov. 10, 2008.

* cited by examiner

*Primary Examiner* — Thomas G Black
*Assistant Examiner* — Lin B Olsen

(57) ABSTRACT

A method controls an internal combustion engine in a drive train having a hydraulic torque converter with a pump wheel and a turbine wheel, during a changeover from an overrun mode into a traction mode. In the method, the rotational speeds of the pump wheel and of the turbine wheel are sensed simultaneously and compared with one another, and a deviation of the rotational speed of the pump wheel from the rotational speed of the turbine wheel being determined. If the rotational speed of the turbine wheel is higher than the rotational speed of the pump wheel and the deviation drops below a predefined threshold value, the torque of the internal combustion engine is set in dependence on the deviation and a rate of change of the rotational speed of the pump wheel. Furthermore a control unit is configured to carry out such a method.

14 Claims, 2 Drawing Sheets

METHOD AND CONTROL UNIT FOR DAMPING LOAD IMPACTS WITH AN OPEN TORQUE CONVERTER LOCKUP CLUTCH

CROSS-REFERENCE TO RELATED APPLICATION

This application claims the priority, under 35 U.S.C. §119, of German application DE 10 2006 061 439.9, filed Dec. 23, 2006; the prior application is herewith incorporated by reference in its entirety.

BACKGROUND OF THE INVENTION

Field of the Invention

The invention relates to a method for controlling an internal combustion engine in a drive train which has a hydraulic torque converter with a pump wheel and a turbine wheel, during a changeover from an overrun mode into a traction mode. The invention also relates to a control unit which is configured to carry out the method.

Such a method and such a control unit are respectively known from German patent DE 102 06 199 C1, which teaches the use of a controller of an internal combustion engine in conjunction with a drive train of a motor vehicle. According to this document, the drive train has rotational angle play and/or is elastically rotatable. Alternative examples are a drive train with a clutch and a dual mass flywheel and a drive train with a hydraulic torque converter. It is considered that the rotational angle play and the elastic rotatability are said to be provided in the drive train between the internal combustion engine and driven wheels for reasons of comfort and to isolate the internal combustion engine from the drive train in terms of oscillation. It is considered disadvantageous that comparatively large load change reactions (“load shocks”) could occur.

In order to reduce the load change reactions, German patent DE 102 06 199 C1 proposes, for the example with the hydraulic torque converter, that differences in rotational speed which occur between a converter end of the drive train and an end of the drive train which is remote from the converter, during a load change, are to be reduced by interventions in the engine controller before the rotational angle play and/or the rotational angle of the elastic twisting is used up. In this context, the turbine wheel constitutes the converter end of the drive train and a driven wheel of the motor vehicle constitutes an end of the drive train which is remote from the converter.

The intention is that the occurrence of appreciable load shocks is to be avoided. A uniform rotational speed at a docking point, which German patent DE 102 06 199 C1 defines as a structurally predefined maximum twisting angle between elements of the drive train which are subject to play is specified as being the ideal case. In other words, when the load change from the overrun mode to the traction mode occurs, the drive train which is tensioned in one direction in the overrun mode is released in a controlled fashion and tensioned in the other direction, in which case play which is present is moved to other edges. The docking point characterizes the time at which the play moves and the drive train is tensioned or pressed in the other direction. The prior art reference concentrates on releasing the drive train gently from a first rotational angle stop which is effective in the overrun mode and applying it gently to a second rotational angle stop which is effective in the traction mode. In this context, rotational angle stop is produced by two adjacent edges of components which are mechanically coupled with play coming to bear and/or by virtue of the fact that an elastic restoring torque is the value of the twisting torque.

In this context, German patent DE 102 06 199 C1 makes use of the fact that modern motor vehicles are equipped with what is referred to as an electronic accelerator pedal in which the position of the accelerator pedal still represents the torque request by the driver but no longer directly determines the throttle valve position. The torque-determining and power-determining throttle valve position is set by the control unit in German patent DE 102 06 199 C1 at the load change not only as a function of the request of the driver but also additionally as a function of differences in rotational angle and rotational speed between various positions on the drive train.

German patent DE 102 06 199 C1 specifies in this context as influencing variables the total angle of the twisting of the drive train which results from the play and/or elastic deformations, the angular speed of the primary side when the overrun mode ends, the angular speed of the secondary side at the docking time and the acceleration capability and/or the braking capability of the internal combustion engine.

The terms of the primary side and the secondary side relate clearly here to the example with the dual-mass flywheel. This results from the fact that German patent DE 102 06 199 C1 specifies these terms only in conjunction with the example of the drive train which has a dual-mass flywheel. At another point in DE 102 06 199 C1 it is stated that the rotational speed of the combustion engine for the example with the hydraulic torque converter does not constitute a significant variable for the rotational speed on the turbine side of the torque converter.

Instead, in this case the torque which is transmitted by the torque converter or the turbine torque of the torque converter are important parameters. In order to reduce a load shock, it is proposed in this context to control the transmitted torque of the torque converter or its turbine torque. As a result, the difference between the rotational speeds of the converter end and the end which is remote from the converter, of the drive train which has the elasticity and play, can be influenced.

In the control of the internal combustion engine in the case of a load change, DE 102 06 199 C1 differentiates essentially two phases: in a first phase which is referred to as a waiting phase, the torque of the internal combustion engine which corresponds to the request of the driver is set and is transferred to the drive train without further measures. In contrast, in a second phase which is referred to as the intervention time, the torque of the internal combustion engine is reduced by an ignition intervention and/or by changing the position of the throttle valve.

SUMMARY OF THE INVENTION

It is accordingly an object of the invention to provide a method and a control unit for damping load impacts with an open torque converter lockup clutch that overcomes the above-mentioned disadvantages of the prior art methods and devices of this general type.

With the foregoing and other objects in view there is provided, in accordance with the invention, a method for controlling an internal combustion engine in a drive train during a changeover from an overrun mode into a traction mode. The drive train has a hydraulic torque converter with a pump wheel and a turbine wheel. The method includes the steps of: sensing simultaneously rotational speeds of the pump wheel and of the turbine wheel; comparing the rotational speeds of the pump wheel and the turbine wheel with one another; and determining a deviation of the rotational speed of the pump wheel from the rotational speed of the turbine wheel. If the rotational speed of the turbine wheel is higher than the rotational speed of the pump wheel and the deviation drops below a predefined threshold value, a torque of the internal combustion engine is set in dependence on the deviation and a rate of change of the rotational speed of the pump wheel.

These features provide for the rotational speeds of the pump wheel and of the turbine wheel to be sensed simultaneously and compared and for a deviation of the rotational speed of the pump wheel from the rotational speed of the turbine wheel to be determined. As a result, the changeover from an overrun operating state in which virtually no torque is transmitted from the pump wheel to the turbine wheel to a state with transmission of torque can be detected precisely.

It is this changeover, which under certain circumstances, specifically when the rotational speed of the pump wheel was previously smaller than the rotational speed of the turbine wheel, leads to a jolting build up in the torque which is transmitted to the turbine wheel. The transmission from the pump wheel to the turbine wheel which starts in a jolting fashion acts as an undesired pulsed excitation of a rotary oscillation in the subsequent drive train.

There is also provision for the torque of the internal combustion engine to be set under certain conditions in dependence on the deviation of the rotational speed of the pump wheel from the rotational speed of the turbine wheel, and in dependence on a rate of change of the rotational speed of the pump wheel. As a result, in this critical situation other influencing variables come about as a result of the shifting of the influence of the request of the driver onto the formation of a setpoint value of the torque. These other influencing variables permit the rotational speed of the pump wheel to be approximated comparatively slowly to the rotational speed of the turbine wheel. This approximation which takes place slowly is triggered if the rotational speed of the turbine wheel is higher than the rotational speed of the pump wheel and the deviation simultaneously drops below a predefined threshold value.

When the rotational speeds approximate, the pressure and flow conditions in the converter which are necessary for the transmission of torque build up more slowly and more continuously by comparison, which leads to a comparatively gentle start to the transmission of torque to the turbine wheel, and thus a reduction in the undesired excitation of the drive train.

The invention therefore relates to a control of the internal combustion engine which takes into account properties of the torque converter. In contrast, the subject matter of German patent DE 102 06 199 C1 is concerned with a gentle release of the drive train which is located downstream of the torque converter from a rotational speed stop which is effective in the overrun mode, and a gentle application against a rotational speed stop which is effective in the traction mode. The document is therefore not concerned with avoiding jolting torque peaks in the turbine torque.

In the driving mode, the effects of the two causes are mixed with one another—influences of rotational speed play and elastic deformations of the drive train give rise to load shocks, as do torque peaks in the turbine torque which are caused by a jolting intervention by the converter. In this context, the invention provides a solution with which load shocks which are caused by sudden starting of the transmission of force within the torque converter are reduced, or ideally completely avoided.

In accordance with an added mode of the invention, there is the step of setting the torque of the internal combustion engine in dependence on the deviation and the rate of change if a driving stability program has not been deactivated. Alternatively, the torque of the internal combustion engine is set in dependence on the deviation and the rate of change only if a change in a transmission ratio which is set in a change speed gearbox is not implemented. Further alternatively, the torque of the internal combustion engine is set in dependence on the deviation and the rate of change if a modification of a control of the internal combustion engine for accelerated heating of catalytic converter is not activated. Additionally, the torque of the internal combustion engine is set in dependence on the deviation and the rate of change only if a torque converter lockup clutch is not closed. Preferably, the torque of the internal combustion engine is set in dependence on a transmission ratio which is set in a change speed gearbox or in dependence on a request of a driver. Finally, the torque of the internal combustion engine can be set in dependence on the deviation and the rate of change until the deviation exceeds the predefined threshold value after a change of a sign of the deviation.

Of course, the features which are mentioned above and which are also to be explained below can be used not only in the respectively specified combination but also in other combinations or in isolation without departing from the scope of the present invention.

Other features which are considered as characteristic for the invention are set forth in the appended claims.

Although the invention is illustrated and described herein as embodied in a method and a control unit for damping load impacts with an open torque converter lockup clutch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF DRAWING

DETAILED DESCRIPTION OF THE INVENTION

Figure 1:
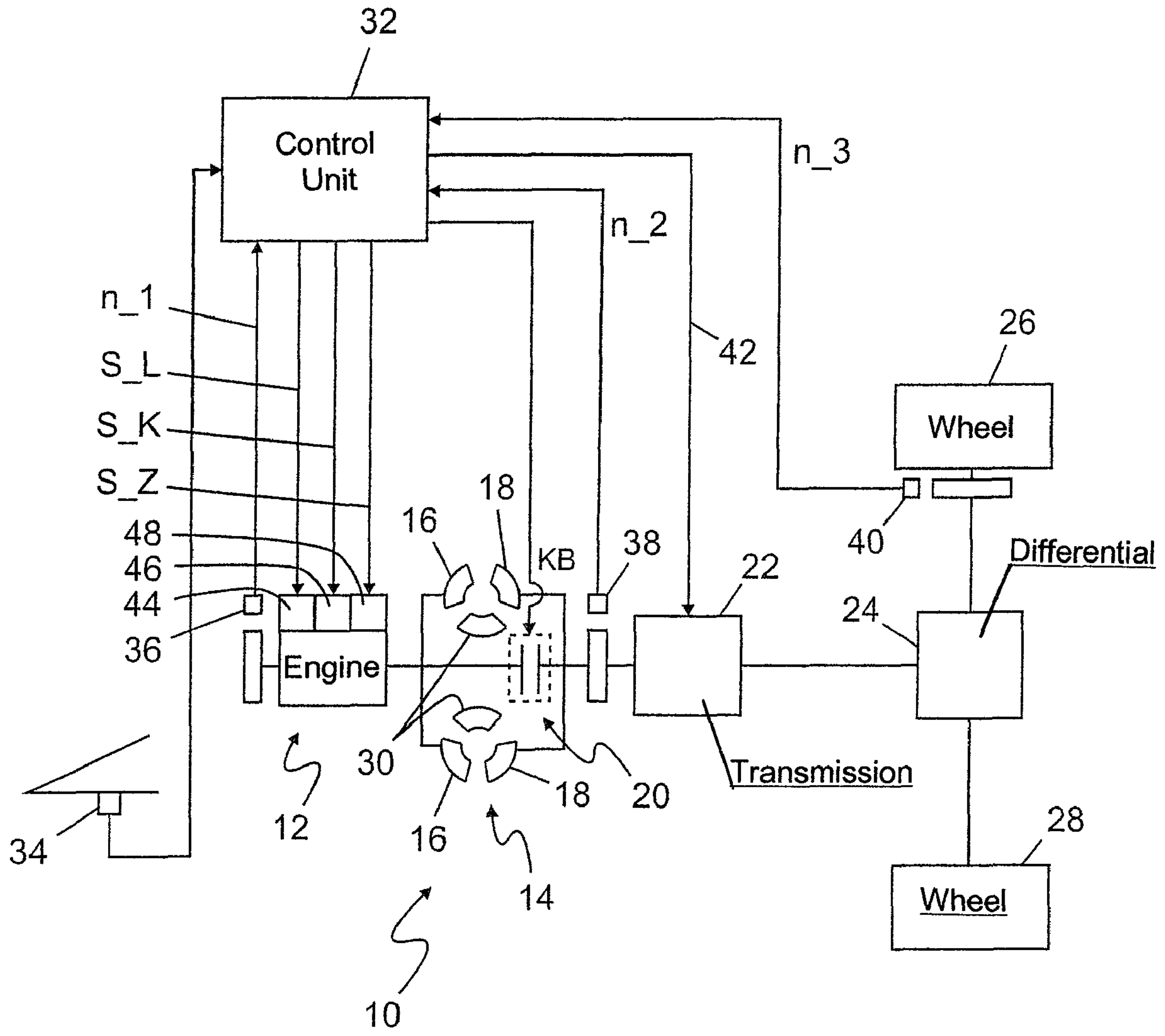
FIG. 1 is an illustration of an internal combustion engine in a drive train which has a hydraulic torque converter with a pump wheel and a turbine wheel.

Referring now to the figures of the drawing in detail and first, particularly, to FIG. 1 thereof, there is shown a drive train 10 of a motor vehicle with an internal combustion engine 12, a hydraulic torque converter 14 which has at least a pump wheel 16, a turbine wheel 18 and a torque converter lockup clutch 20, a change speed gearbox 22, a differential gear mechanism 24 and driven wheels 26 and 28.

Hydrodynamic converters, which operate not only as a flow coupling but also as a torque converter, also have a guiding wheel 30 which deflects the hydraulic fluid, circulating between the pump wheel 16 and turbine wheel 18, as a function of a difference in the rotational speed between the pump wheel 16 and the turbine wheel 18. The pump wheel 16 is connected to a crankshaft of the internal combustion engine 12 in a rotationally fixed fashion, while the turbine wheel 18 is connected to a drive shaft of the change speed gearbox 22 in a rotationally fixed fashion. The torque converter lockup clutch 20 is a controllable friction clutch which is parallel to the torque converter 14.

The internal combustion engine 12 is controlled by a control unit 32 which, for this purpose, processes signals in which various operating parameters of the drive train 10 are represented. In the illustration in FIG. 1, these are principally signals from a driver's request signal transmitter 34 which senses a torque request FW of the driver, a signal n_1 of a first rotational speed signal transmitter 36, which senses a rotational speed of the pump wheel 16 as a rotational speed of the crankshaft of the internal combustion engine 10, a signal n_2 of a second rotational speed signal transmitter 38 which senses a rotational speed n_2 of the turbine wheel 18, and alternatively or additionally to a sensed signal n_2, the signal n_3 of a wheel speed sensor 40 which senses a rotational speed n_3 of a driven wheel 26 of the motor vehicle.

On the proviso that the control unit 32 knows the gear speed which has been engaged in the change speed gearbox (transmission) 22, it can determine the rotational speed n_2 from the rotational speed n_3 and the present transmission ratio. In the embodiment in FIG. 1, the control unit 32 also controls the change speed gearbox 22 via a control connection 42, and also the closed state of the torque converter lockup clutch 20 using a signal KB.

The second rotational speed n_2 results from the driving speed, that is to say the rotational speed n_3, in a specific driving position of the change speed gearbox 22.

If various control units are used to control the internal combustion engine 12 and the change speed gearbox 22, they are connected to one another by a bus system in modern motor vehicles. For this reason, in this case the transmission ratio is also known in the engine control unit 32 and can be used there to model or measure the rotational speed n_2 of the turbine wheel 18. Alternatively, the modeling or measurement of the rotational speed of the turbine wheel 18 takes place in a separate gearbox control unit. The modeled or measured rotational speed n_2 of the turbine wheel 18 is transferred to the control unit 32 of the internal combustion engine 10 via the bus system in this case.

The use of the rotational speed sensor 40 which is present in any case for antilock brake systems and/or vehicle movement dynamic controllers therefore has cost advantages which result from possible elimination of the second rotational speed signal transmitter 38.

Of course, modern drive trains 10 are equipped with a multiplicity of further sensors which are not illustrated here for reasons of clarity. Examples of such sensors are air mass flow rate meters, temperature sensors, pressure sensors etc. for sensing operating parameters of the internal combustion engine 12. The listing of the signal transmitters and sensors 34 to 40 is therefore not to be considered a conclusive listing.

It is also not necessary for there to be a separate sensor for each operating parameter which is processed by the control unit 32, because the control unit 32 can model various operating parameters using computing models from other measured operating parameters.

From the received signal transmitter and sensor signals, the control unit 32 forms, inter alia, manipulated variables S_L, S_K and S_Z for setting the internal combustion engine 12 in order to generate the torque.

Moreover, the control unit 32 is configured, in particular programmed, to carry out the method according to the invention or one of its configurations and/or to control the corresponding method sequence.

The internal combustion 12 usually has subsystems 44, 46, 48 as actuating elements, one subsystem 44 of which serves to control the charging of combustion chambers, one subsystem 46 of which serves to control the formation of mixture, and one subsystem 48 of which serves to control the ignition of the charges of the combustion chambers. The subsystem 44 for controlling the charges has, in one configuration, an electronically controlled throttle valve for controlling the air supply to the internal combustion engine 12, which throttle value is actuated with an actuation signal S_L. The subsystem 46 for controlling the formation of mixture has, in one configuration, an arrangement of injectors by which fuel is metered into an intake manifold or into individual combustion chambers of the internal combustion engine 12 using actuation signals S_K. Actuation signals S_Z serve to trigger ignitions in the combustion chambers.

The torque which is generated by the internal combustion engine 12 can, in particular, be reduced by restrictions on the charges of the combustion chamber and/or by switching off the fuel supply to one or more combustion chambers and/or by delaying the triggering of the ignitions in relation to an ignition time at which an optimum torque would be produced (adjustment of the ignition in the retarded direction).

Figure 2:
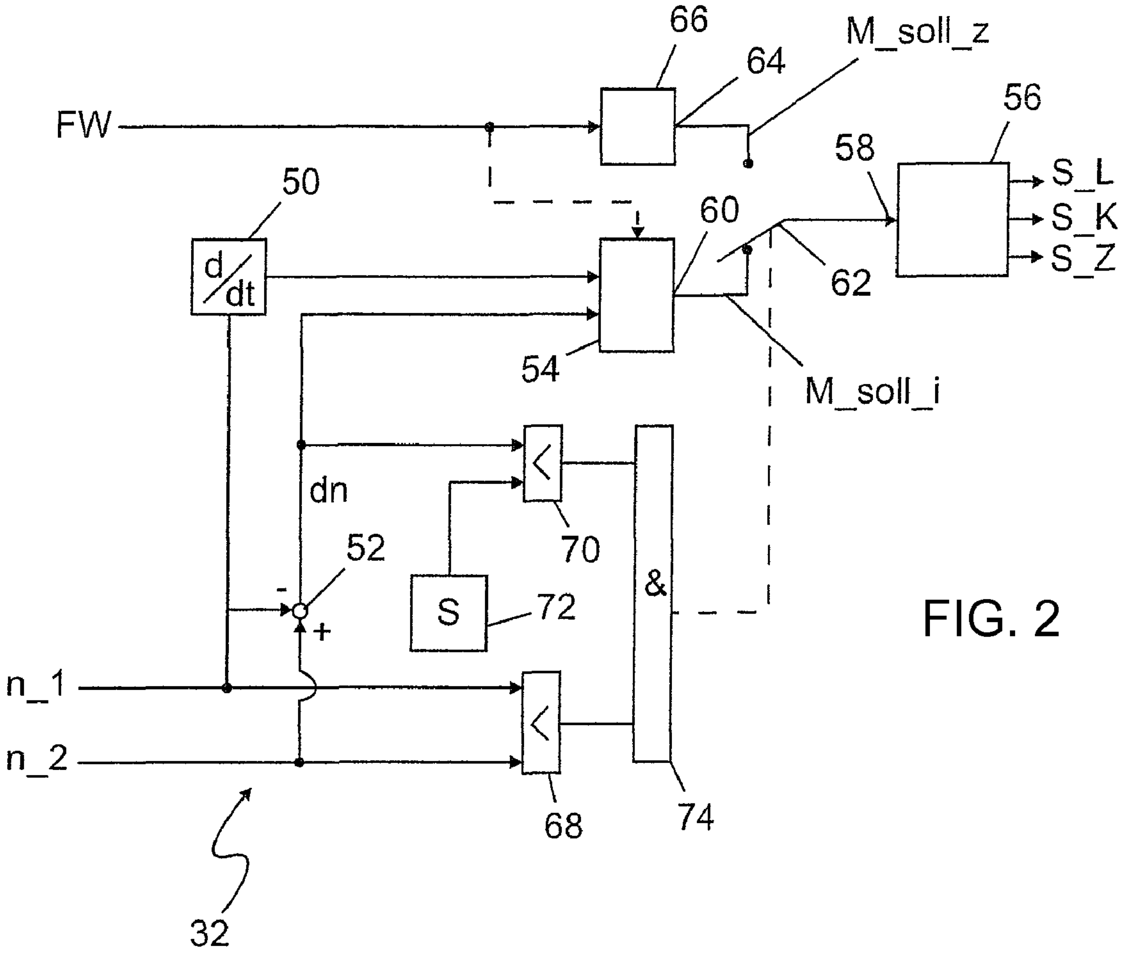
FIG. 2 is a block circuit diagram illustrating an exemplary embodiment according to the invention.

FIG. 2 illustrates a configuration of the invention in the form of a block circuit diagram of the control unit 32. The individual blocks can be assigned here both to individual method steps and to functional models of the control unit 32 so that FIG. 2 discloses both method aspects and device aspects of the invention.

In the configuration in FIG. 2, the control unit 32 processes the signals FW, n_1 and n_2 to form the actuation signals S_L, S_K and S_Z. In this context, the control unit 32 simultaneously senses the rotational speed n_1 of the pump wheel 16 and the rotational speed n_2 of the turbine wheel 18. As has already been explained, as an alternative to a measurement n_2 can also be modeled from the signals of other sensors. A block 50 serves to determine a rate of change of the rotational speed n_1 of the pump wheel 16. In one configuration, the determination is carried out by forming a derivative over time d/dt(n_1).

In a logic element 52, a deviation of the rotational speed n_1 of the pump wheel 16 from the rotational speed n_2 of the turbine wheel 18 is determined. In the configuration in FIG. 2, the determination is carried out by the deviation being formed as a difference dn=n_2−n_1. With the determined values for the deviation dn and the rate of change d/dt(n_1) of the rotational speed n_1 of the pump wheel 16 a non-steady state setpoint value signal transmitter 54 is addressed, the latter outputting setpoint values M_soll_i for the torque of the internal combustion engine 12 as a function of its input variables dn and d/dt(n_1).

The setpoint values M_soll_i which are output by the non-steady state setpoint value signal transmitter 54 serve to actuate a block 56 in which at least one of the manipulated variables S_L, S_K and S_Z are formed. In this context, the manipulated variables S_L and/or S_K and/or S_Z are formed in order to actuate the subsystems 44 and/or 46 and/or 48 from FIG. 1 so that the internal combustion engine 12 generates the requested torque M_soll_i.

In the configuration in FIG. 2, the torque of the internal combustion engine 12 is set as a function of the deviation dn and a rate of change d/dt(n_1) of the rotational speed n_1 of the pump wheel 16 if an input 58 of the block 56 is connected to the output 60 of the non-steady state setpoint value signal transmitter 54. In the configuration in FIG. 2, the connection is made using a software switch 62 which connects the input 58 of the block 56 either to the output 60 of the non-steady state setpoint value signal transmitter 54 or to an output 64 of a traction mode setpoint value signal transmitter 66. The traction mode setpoint value signal transmitter 66 serves to output torque setpoint values M_soll_z in the traction mode in which a dominant dependence of the torque setpoint value on the driver's request FW or on other requests is desired, the latter being formed in the control unit 32 for a control operation of the internal combustion engine 12. Such requests result, for example, as a result of a rotational speed limiting operation, during which the torque of the internal combustion engine 12 is, when necessary, reduced in order to prevent a maximum permissible rotational speed of the internal combustion engine 12.

Under certain conditions, the software switch 62 disconnects the torque-setpoint value predefining device, and thus the device for setting the torque of the internal combustion engine from the traction mode setpoint value signal transmitter 66 and connects the output 60 of the non-steady state setpoint value signal transmitter 54 to the input 58 of the block 56. In the configuration in FIG. 2, these conditions apply if the rotational speed n_2 of the turbine wheel 18 is higher than the rotational speed n_1 of the pump wheel 16 and the deviation undershoots a predefined threshold value S.

For this purpose, a comparison of the rotational speed values n_1 and n_2 which are sensed simultaneously takes place in the comparator 68. A signal at the output of the comparator 68 indicates whether the rotational speed n_2 of the turbine wheel 18 is higher than the rotational speed n_1 of the pump wheel 16. The situation occurs typically in the overrun mode. In one configuration, the comparator 68 then supplies a logic 1, while in the traction mode in which n_1 is typically higher than or equal to n_2 it supplies a logic zero.

In addition, a comparison of the deviation dn formed in the logic element 52 with a predetermined threshold value S, which is made available by a memory cell 72, takes place chronologically in parallel in a further comparator 70. The comparison is carried out in such a way that a signal at the output of the comparator 70 specifies whether the threshold value S is undershot. In one configuration, the comparator 70 supplies a logic one. The output signals of the comparators 68 and 70 are logically linked to one another by an And logic operation. The switch position of the software switch 62 is controlled with the output of the And logic operation 74 in such a way that the output 60 of the non-steady state setpoint value signal transmitter 54 is connected to the input 58 of the block 56 particularly when n_1 undershoots n_2 and the deviation dn=n_2−n_1 undershoots the predetermined threshold value S.

As a result, the rotational speeds n_1 of the pump wheel 16 and n_2 of the turbine wheel 18 are therefore sensed simultaneously and compared with one another, and a deviation dn of the rotational speed n_1 of the pump wheel 16 from the rotational speed n_2 of the turbine wheel 18 is determined, and if the rotational speed n_2 of the turbine wheel 18 is higher than the rotational speed n_1 of the pump wheel 16 and the deviation dn which is equal to n_2−n_1 undershoots a predefined threshold value S, the torque of the internal combustion engine is set as a function of the deviation dn and a rate of change d/dt(n_1) of the pump wheel 16.

In this case, the torque setpoint values are predefined as a function of a deviation dn of the rotational speed and a rate of change d/dt(n_1) of a rotational speed n_1, which permits the rotational speed n_1 of the pump wheel 16 to be adjusted to the value of the rotational speed n_2 of the turbine wheel 18 with a PD characteristic (P equal proportional, D equals differential).

In one preferred configuration, the torque setpoint value is not predefined by the non-steady state setpoint value signal transmitter 54 completely independently of the driver's request FW, which is represented in FIG. 2 by the dashed line for the feeding of the signal FW to the block 54. The dependence on the driver's request is preferably implemented in the non-steady state setpoint value signal transmitter 54 in such a way that rapid and firm activation of an accelerator pedal permits the driver's request FW to act in a pronounced way, and PD control function to act in a restricted way. The control unit 32 interprets such activation of the accelerator pedal by the driver as a request for priority of the torque request over comfort functions such as load shock damping.

Figure 3:
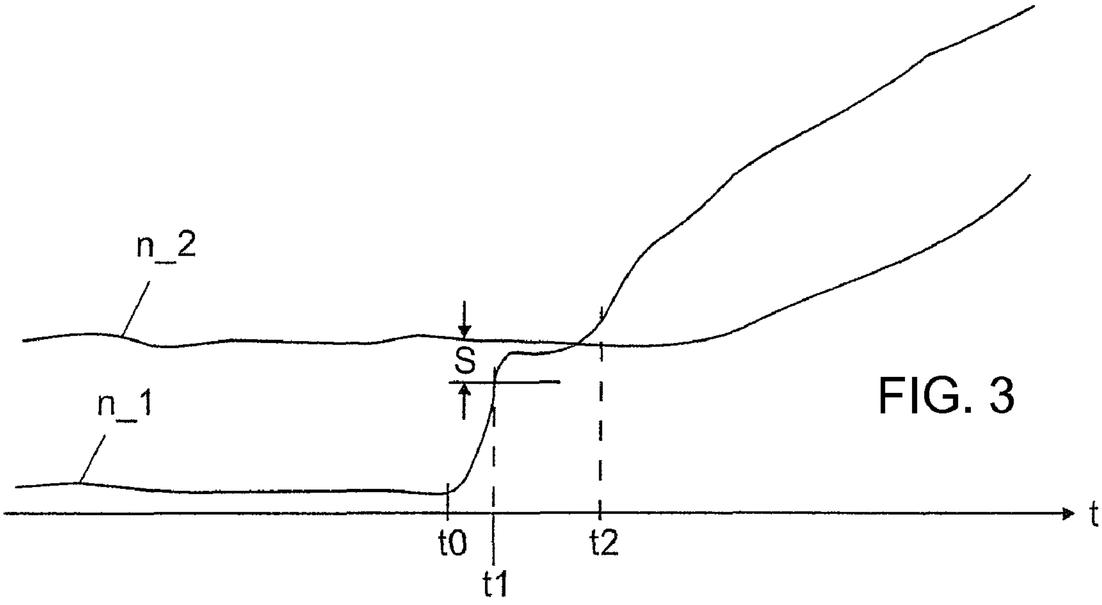
FIG. 3 is a graph showing time profiles of rotational speeds of a pump wheel and turbine wheel, such as occur when there is a load change according to the invention.

FIG. 3 shows qualitative profiles of the rotational speeds n_1 and n_2 plotted against time t when the method according to the invention is carried out. For the times to the left of t0 the drive train 10 is in the overrun mode with opened torque converter lockup clutch 20. The rotational speed n_1 of the pump wheel 16 is lower than the rotational speed n_2 of the turbine wheel 18. The torque converter 14 does not transmit any torque. Such conditions occur, for example, if the motor vehicle is rolling at a low speed and the driver reduces his torque request further. A low speed is understood in this context to be a speed of less than 40 km/h. When the torque converter lockup clutch 20 is open, the rotational speed n_1 of the pump wheel 16 then drops below the rotational speed n_2 of the turbine wheel 18.

At the time t0, the driver requests a higher torque at which the drive train 10 changes from the overrun mode into the traction mode. The predefinition of the torque setpoint value is dominated here initially by the driver's request FW for a higher torque so that the rotational speed n_1 of the internal combustion engine 12 initially rises. Since the rotational speed of the pump wheel 16 which corresponds to the rotational speed n_1 of the internal combustion engine is still lower at the beginning than the rotational speed n_2 of the turbine wheel 18, there is still no appreciable transmission of torque from the pump wheel 16 to the turbine wheel 18 at the beginning. The pump wheel 16 therefore initially rotates at a high speed without being loaded, which is partially responsible for the initial steep rise in the rotational speed n_1.

At the time t1, the deviation of the rotational speed n_1 from the rotational speed n_2 drops below the threshold value S, in which case the rotational speed n_2 of the turbine wheel 18 initially remains higher than the rotational speed n_1 of the pump wheel 16. As a result, the software switch 62 in FIG. 2 is switched over so that the setpoint value predefining device is disconnected from the dominance of the driver's request by the traction mode setpoint value signal transmitter 66 and setpoint values are predefined by the non-steady state setpoint value signal transmitter 54. The setpoint values are therefore predefined as a function of the rate of change d/dt(n_1) of the rotational speed n_1 and the value of the deviation of the rotational speed n_1 of the pump wheel 16 from the rotational speed n_2 of the turbine wheel 18.

The predefinition of the setpoint values by the non-steady state setpoint value signal transmitter 54 is carried out with the objective of allowing the rotational speed n_1 of the pump wheel 16 to pass through the value of the rotational speed n_2 of the turbine wheel 18 with a comparatively flat gradient so that the transmission of torque starts in a gentle way. As has already been mentioned, the transmission of torque starts when the rotational speed n_1 of the pump wheel 16 exceeds the rotational speed n_2 of the turbine wheel 18 or at least approaches it.

As soon as the transmission torque by the torque converter 14 has started, the predefinition of setpoint values is switched over to the traction mode setpoint value signal transmitter 66. In the configuration in FIG. 2, this takes place when the value of the deviation dn is greater than or equal to zero. However, the switching over to the predefinition of setpoint values via the traction mode setpoint value signal transmitter 66 can also be configured in such a way that it takes place at a configurably positive or negative difference n_1 in rotational speed minus n_2. In the case of the subject matter in FIG. 3, this switching over takes place at the time t2. Alternatively or additionally, the switching over can also take place after a predetermined time period after the time t1 has elapsed.

It is preferred for the switching back to the predefinition of setpoint values by the traction mode setpoint value signal transmitter 66 to take place when the rotational speed n_1 of the pump wheel 16 exceeds the sum of the rotational speed n_2 of the turbine wheel 18 and a predetermined offset. In other words, this configuration provides for the torque of the internal combustion engine to be set as a function of the deviation dn and the rate of change d/dt(n_1) until the deviation exceeds a predetermined threshold value after a change in its sign. It is also preferred for the offset at which the predefinition of setpoint values by the non-steady state setpoint value signal transmitter 54 is activated and deactivated to be configurable for each gear speed in the change speed gearbox 22 so that the torque of the internal combustion engine 12 is additionally set as a function of a transmission ratio which has been set in the change speed gearbox 22.

Both configurations permit load shock damping which is adapted to the traction force and the inertia conditions at the various velocities and gear speeds and with the converter lock clutch open.

A further preferred configuration provides for the torque of the internal combustion engine 12 to be set as a function of the deviation dn and the rate of change d/dt(n_1) only if a driving stability program has not been deactivated and/or if a change in the transmission ratio which has been set at the gearbox is just not carried out and/or if a modification of the control of the internal combustion engine 12 for accelerated heating of a catalytic converter is not activated and/or the torque of the internal combustion engine 12 is set as a function of the difference dn and the rate of change d/dt(n_1) only if the torque converter lockup clutch 20 is not closed.

These configurations prevent disruption to these control processes. This is appropriate because these processes generally have a higher priority than the load shock damping which is provided for reasons of comfort. These restrictions are preferably implemented as supplementary input conditions for the And logic element 74 in FIG. 2.

The invention claimed is:

1. A method for controlling an internal combustion engine in a drive train during a changeover from an overrun mode into a traction mode, the drive train having a hydraulic torque converter with a pump wheel and a turbine wheel, which comprises the step of:

sensing simultaneously rotational speeds of the pump wheel and of the turbine wheel;

comparing the rotational speeds of the pump wheel and the turbine wheel with one another;

determining a deviation of the rotational speed of the pump wheel from the rotational speed of the turbine wheel; and if the rotational speed of the turbine wheel is higher than the rotational speed of the pump wheel and the deviation drops below a predefined threshold value, setting a torque of the internal combustion engine in dependence on the deviation and a rate of change of the rotational speed of the pump wheel if a driving stability program has not been deactivated.

2. The method according to claim 1, which further comprises setting the torque of the internal combustion engine in dependence on the deviation and the rate of change only if a change in a transmission ratio which is set in a change speed gearbox is not implemented.

3. The method according to claim 1, which further comprises setting the torque of the internal combustion engine in dependence on the deviation and the rate of change if a modification of a control of the internal combustion engine for accelerated heating of catalytic converter is not activated.

4. The method according to claim 1, which further comprises setting the torque of the internal combustion engine in dependence on the deviation and the rate of change only if a torque converter lockup clutch is not closed.

5. The method according to claim 1, which further comprises setting the torque of the internal combustion engine additionally in dependence on a transmission ratio which is set in a change speed gearbox.

6. The method according to claim 1, which further comprises setting the torque of the internal combustion engine additionally in dependence on a request of a driver.

7. The method according to claim 1, which further comprises setting the torque of the internal combustion engine in dependence on the deviation and the rate of change until the deviation exceeds the predefined threshold value after a change of a sign of the deviation.

8. A control unit for controlling an internal combustion engine in a drive train during a changeover from an overrun mode into a traction mode, the drive train having a hydraulic torque converter with a pump wheel and a turbine wheel, the control unit comprising:

a controller programmed to:

simultaneously sense rotational speeds of the pump wheel and of the turbine wheel;

compare the rotational speeds of the pump wheel and of the turbine wheel with one another;

determine a deviation of the rotational speed of the pump wheel from the rotational speed of the turbine wheel;

set a torque of the internal combustion engine in dependence on the deviation and of a rate of change of the rotational speed of the pump wheel if the rotational speed of the turbine wheel is higher than the rotational speed of the pump wheel and the deviation drops below a predefined threshold value; and set the torque of the internal combustion engine in dependence on the deviation and the rate of change if a modification of a control of the internal combustion engine for accelerated heating of a catalytic converter is not activated.

9. The control unit according to claim 8, wherein said controller is further programmed to set the torque of the internal combustion engine in dependence on the deviation and the rate of change if a driving stability program has not been deactivated.

10. The control unit according to claim 8, wherein said controller is further programmed to set the torque of the internal combustion engine in dependence on the deviation and the rate of change only if a change in a transmission ratio which is set in a change speed gearbox is not implemented.

11. The control unit according to claim 8, wherein said controller is further programmed to set the torque of the internal combustion engine in dependence on the deviation and the rate of change only if a torque converter lockup clutch is not closed.

12. The control unit according to claim 8, wherein said controller is further programmed to set the torque of the internal combustion engine additionally in dependence on a transmission ratio which is set in a change speed gearbox.

13. The control unit according to claim 8, wherein said controller is further programmed to set the torque of the internal combustion engine additionally in dependence on a request of a driver.

14. The control unit according to claim 8, wherein said controller is further programmed to set the torque of the internal combustion engine in dependence on the deviation and the rate of change until the deviation exceeds the predefined threshold value after a change of a sign of said deviation.

* * * * *